United States Patent
Amir et al.

(10) Patent No.: US 10,725,494 B2
(45) Date of Patent: Jul. 28, 2020

(54) OPTIMIZING NEUROSYNAPTIC NETWORKS

(71) Applicant: INTERNATIONAL BUSINESS MACHINES CORPORATION, Armonk, NY (US)

(72) Inventors: Arnon Amir, San Jose, CA (US); Pallab Datta, San Jose, CA (US); Dharmendra S. Modha, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/423,928

(22) Filed: May 28, 2019

(65) Prior Publication Data

US 2019/0278320 A1   Sep. 12, 2019

Related U.S. Application Data

(63) Continuation of application No. 15/273,036, filed on Sep. 22, 2016, now Pat. No. 10,338,629.

(51) Int. Cl.
  *G06E 1/00* (2006.01)
  *G06N 3/04* (2006.01)
  *G06N 3/063* (2006.01)

(52) U.S. Cl.
  CPC .............. *G06E 1/00* (2013.01); *G06N 3/04* (2013.01); *G06N 3/049* (2013.01); *G06N 3/063* (2013.01)

(58) Field of Classification Search
  CPC . G06E 1/00; G06N 3/04; G06N 3/063; G06N 3/049
  See application file for complete search history.

(56) References Cited

U.S. PATENT DOCUMENTS

| | | |
|---|---|---|
| 8,977,578 B1 | 3/2015 | Cruz-Albrecht et al. |
| 9,262,712 B2 | 2/2016 | Modha |
| 2004/0181497 A1 | 9/2004 | Dodgson |
| 2011/0016071 A1 | 1/2011 | Guillen et al. |
| 2013/0282649 A1 | 10/2013 | Guanella et al. |
| 2015/0006444 A1 | 1/2015 | Tamatsu et al. |
| 2015/0170021 A1 | 6/2015 | Lupon et al. |
| 2015/0346922 A1 | 12/2015 | Robertson |
| 2016/0350834 A1 | 12/2016 | Wilson et al. |
| 2016/0358070 A1 | 12/2016 | Brothers et al. |
| 2017/0286828 A1 | 10/2017 | Smith |
| 2018/0189056 A1 | 7/2018 | Turakhia et al. |

OTHER PUBLICATIONS

Agarwal, S., Rastogi, D., & Singhal, A. (2015). The era of neurosynaptics: neuromorphic chips and architecture. European Scientific Journal: See pp. 135-136.

(Continued)

*Primary Examiner* — Ajay Ojha
(74) *Attorney, Agent, or Firm* — Erik Huestis; Stephen Kenny; Foley Hoag, LLP

(57) ABSTRACT

Reduction in the number of neurons and axons in a neurosynaptic network while maintaining its functionality is provided. A neural network description describing a neural network is read. One or more functional unit of the neural network is identified. The one or more functional unit of the neural network is optimized. An optimized neural network description is written based on the optimized functional unit.

16 Claims, 14 Drawing Sheets

(56) References Cited

OTHER PUBLICATIONS

Cassidy, A. S., Merolla, P., Arthur, J.V. et al. (2013). Cognitive computing building block: A versatile and efficient digital neuron model for neurosynaptic cores. Neural Networks (IJCNN), The 2013 International Joint Conference, 1-10: See sections V & VI.
Eichner et al., "Neural Simulations on Multi-Core Architectures," Frontiers in Neuroinformatics, 3(21):1-15 (2009).
Esser, S. K, Andreopoulos, A., Appuswamy, R. et al. (2013). Cognitive computing systems: Algorithms and applications for networks of neurosynaptic cores. Neural Networks (IJCNN), The 2013 International Joint Conference, 1-10: See figure 3.
Furber, "Large-Scale Neuromorphic Computing Systems," J Neural Eng., 13:051001 (2016).
Indiveri, G. & Liu, S.C. "Memory and Information Processing in Neuromorphic Systems," In Proceedings of the IEEE, 103(8), 1379-1397. doi: 10.1109/JPROC2015.2444094: See sections IIA & IIB.
Liang, X., & Ma, L. (2004). A study of removing hidden neurons in cascade-correlation neural networks. In International Joint Conference on Neural Networks: See sections 1 & 2.
Pedroni, B.U., Das, S., Arthur, J. V. et al. (2015). Mapping Generative Models onto Networks of Digital Spiking Neurons. See figure 13 & sections V:A-V:C.
Suzuki, K., Horiba, I., & Sugie, N. (2001). A simple neural network pruning algorithm with application to filter synthesis. Neural Processing Letters, 13(1), 43-53: See sections 1 & 5.

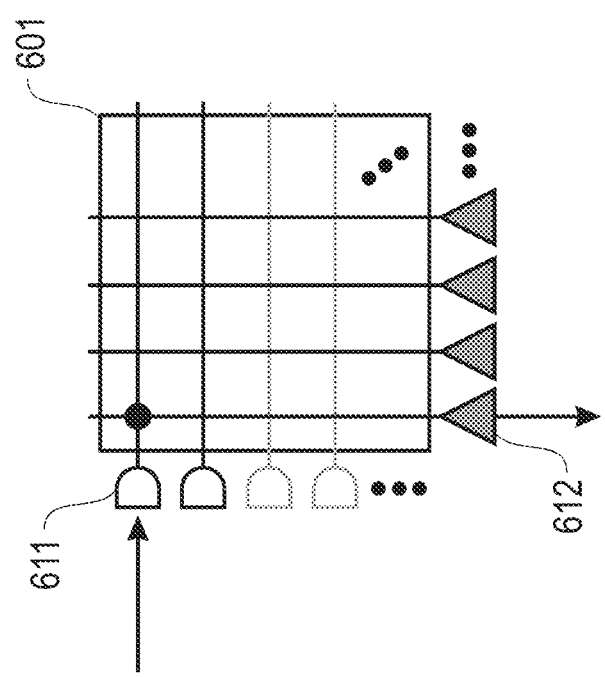

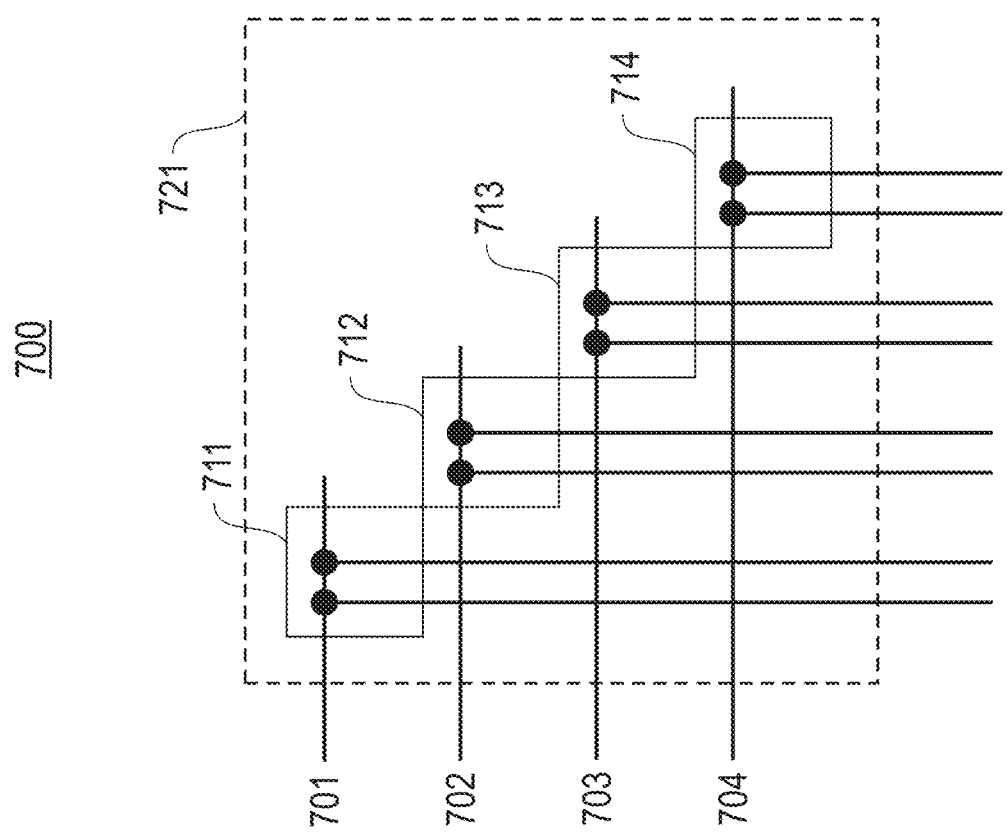

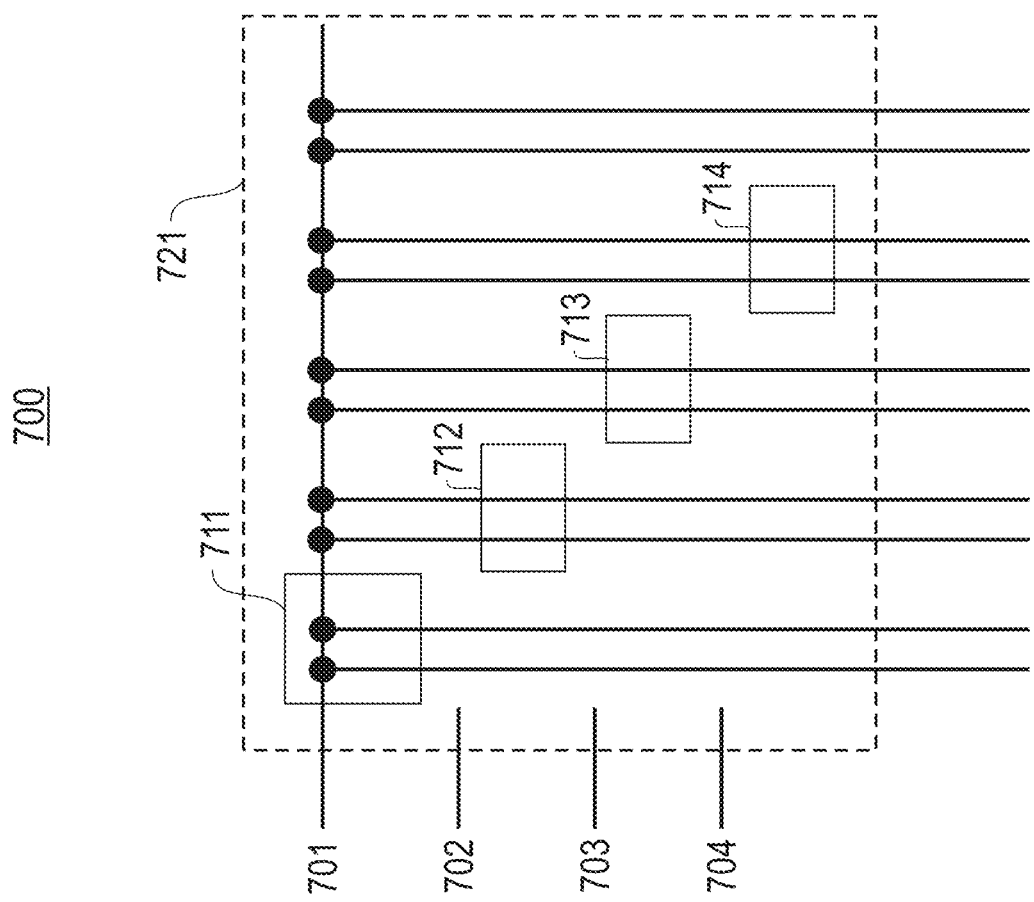

OPTIMIZING NEUROSYNAPTIC NETWORKS

BACKGROUND

Embodiments of the present disclosure relate to optimizing neurosynaptic networks, and more specifically, to reducing the number of neurons and axons in a neurosynaptic network while maintaining its functionality.

BRIEF SUMMARY

According to one embodiment of the present invention, a method of and computer program product for optimizing neurosynaptic networks are provided. In some embodiments, a neural network description describing a neural network is read. One or more functional unit of the neural network is identified. The one or more functional unit of the neural network is optimized. An optimized neural network description is written based on the optimized functional unit.

BRIEF DESCRIPTION OF THE SEVERAL VIEWS OF THE DRAWINGS

FIG. 6 illustrates an exemplary neurosynaptic core according to embodiments of the present disclosure.

FIGS. 7A-C illustrate a network optimization according to embodiments of the present disclosure.

DETAILED DESCRIPTION

Figure 1:
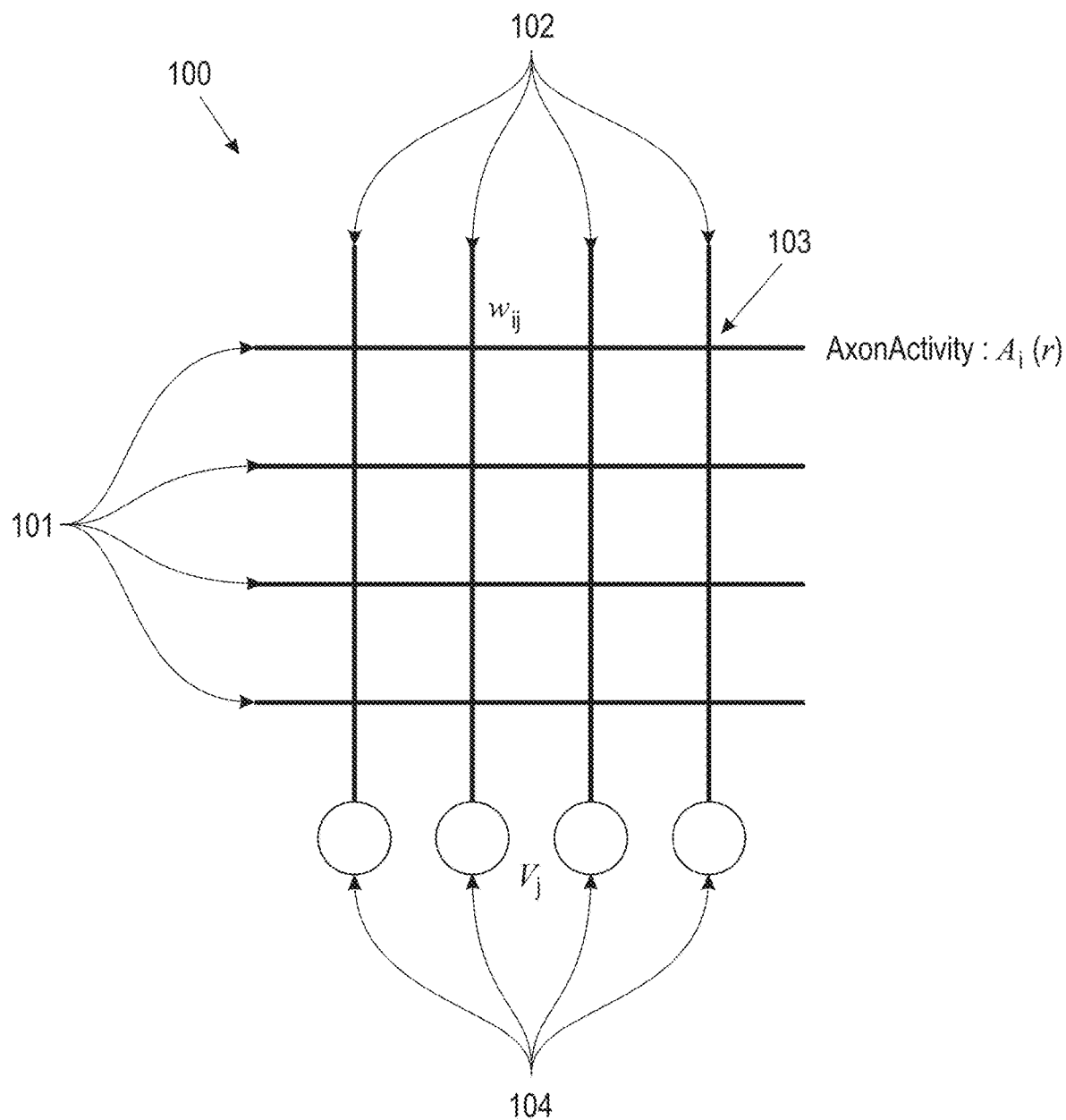
FIG. 1 depicts a neurosynaptic core according to embodiments of the present disclosure.

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar). In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

The number of cores required to implement a network is a major cost factor. As noted above, a single neurosynaptic chip may contain a number of cores. To implement a system, one or more chips are generally needed. In general, the more cores that are placed on a single chip, the higher the size and the cost of the chip. Reducing the number of cores without affecting the functionality reduces size and cost. In addition, when a network is deployed in large quantities, the optimization may be done once while the cost saving is multiplied by the number of deployed systems.

In a fixed-size chip/system with a given number of cores, optimization may result in a reduced number of cores needed. The cores freed up in this manner may be used to add additional functionality or to improve computation accuracy, and hence improve the product without additional hardware costs. In energy-sensitive systems, such as mobile systems, airborne systems, satellites, remote sensors and others, reducing the number of cores may reduce the system's overall energy consumption (although energy consumption may depend on additional factors, such as inter-core communication).

In a simulated network, reducing the number of cores saves memory and processing cycles, reduces the number of required processors, increases speed, and reduces power and overall processing time. Accordingly, there is significant benefit to reducing the number of cores needed to implement a neurosynaptic system. In various embodiment of the present disclosure, reduction in the number of cores is provided by modifying the network topology and removing active neurons and/or active axons in ways which do not change the output computed by the network.

In various embodiments of the repent present disclosure, methods are provided to eliminate neurons and axons from a network. In some embodiments, functionality is preserved with guaranteed one-to-one output spikes. In other embodiments, small modifications in spike activity result, such as changing spikes timing. Such embodiments may be applied on where a given network, or the affected part of it, is known to be agnostic to such changes. For example, continuous rate code is invariant to a constant delay, and so networks making use of such encodings are generally suitable candidates for such methods.

In various embodiments, splitter neurons are optimized to reduce the number of splitter neurons in a subject network. Splitter neurons are neurons which are used to increase the fan out of other neurons, by having several neurons configured to copy their input to the output. A splitter may be characterized as a construct: having one input axon, shared by all the splitter's neurons; and having one or more output neurons, each having a single synapse connecting it to the input axon and configured to produce a spike each time it receives an input spike.

While various examples herein refer to splitter neurons, it will be appreciated that the subject matter of the present disclosure is not limited to splitters and is applicable to other functional units of a neural network, including various types of neurons and axons.

In some embodiments, splitters are modified to reduce the number of neurons used for splitters. This saves neurons and cores on the chip, hence reducing cost and power consumption. Restructuring of the network graph helps placement, decreases degree of core-to-core fan out, and reduces spike traffic across cores and between chips.

As an example, if a core has K groups of splitters, the present disclosure provides for the removal of up to K neurons and K axons, thus reducing the spike traffic by the same saving ratio, reducing the active energy of that part of the network by the same ratio, and increasing the average synaptic density. In large networks this may lead to significant savings in the number of cores. For example, a reduction in cores may allow a network to fit into a chip or board into which it would otherwise not fit.

As set out further below, not all splitters can be removed from a given network. Individual optimization cases are detailed below. When optimizing splitters, various embodiments ensure that involved cores are of the same time scale, or in more general cases, that functionality is preserved or changes within the permissible optimization framework, such as ±1 in the spike time.

In various embodiments, splitters are optimized by rearranging them between cores. For example, splitters may be moved backwards into the core of its source, i.e., the core that contains the neuron which is connected to the input axon of the splitter. In such a case, one neuron is saved. In another example, splitters are moved forward into one of the splitter's destination cores. In such a case, one neuron is saved for each splitter group of two or more neurons. In another example, hierarchical splitter trees are flattened. When a splitter is connected to another splitter, flattening the hierarchy saves neurons. The original network latency may be coded into the neuron delays. In another example, delay neurons are removed and replaced with spike delays. A delay neuron is similar to a splitter with one output. It can sometimes be eliminated by adjusting spike delays on the source neuron. These methods are explained in further detail below with reference to FIGS. 3-5. These methods enable reduction in the size of a network without affecting its functionality. Furthermore, when these methods are applied on large neuromorphic networks comprising multiple corelets, the optimization is carried out across all the sub-networks which were created by multiple sub-corelets. While each sub-corelet may produce an optimal network that cannot be further reduced without affecting its functionality, the combination of multiple optimal networks may produce non-optimal networks. The combined network may therefore benefit from the optimization process provided in this disclosure and is applied on the entire network.

With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 axons and 256 neurons. In such embodiments, there are 256×256=65, 536 synapses. Information flows from axons 101 to the neurons 104, modulated by the synapses 103. In various embodiments, the synapses may be binary, and may be associated with synaptic weights.

Figure 2:
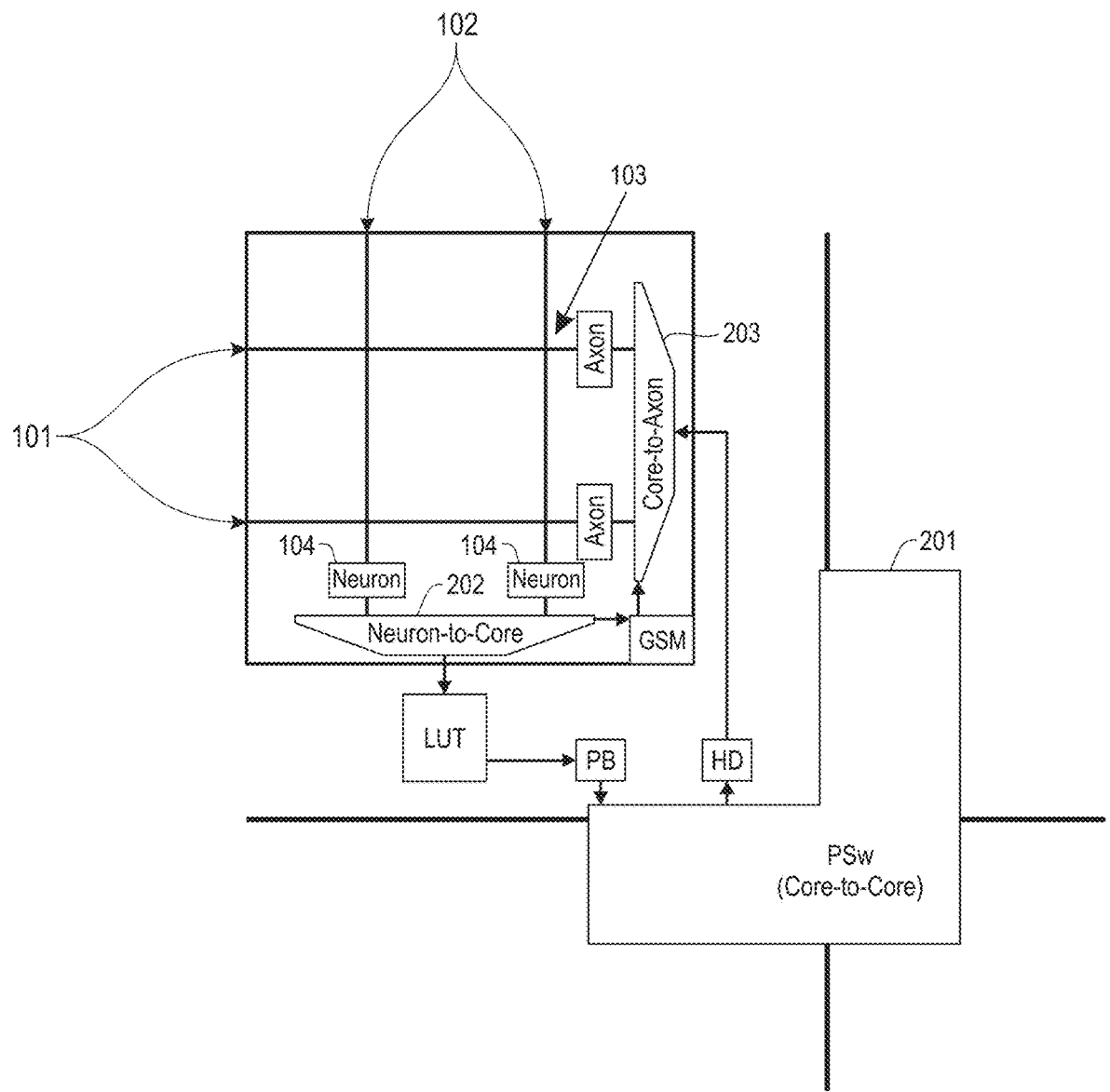
FIG. 2 depicts a neurosynaptic core and mesh router according to embodiments of the present disclosure.

In some embodiments a plurality of neurosynaptic cores are tiled on a chip. In an exemplary embodiments, a 64 by 64 grid of cores is tiled, yielding 4,096 cores, for a total of 1,048,576 neurons and 268,435,456 synapses. In such embodiments, neurons, synapses, and short-distance connectivity are implemented by the core. Long-distance connectivity is logical. An exemplary embodiment is depicted in FIG. 2. Mesh router 201 provides communication between cores. Also on a given core, neuron to core 202 and core to axon 203 communication links are provided.

Figure 3A:
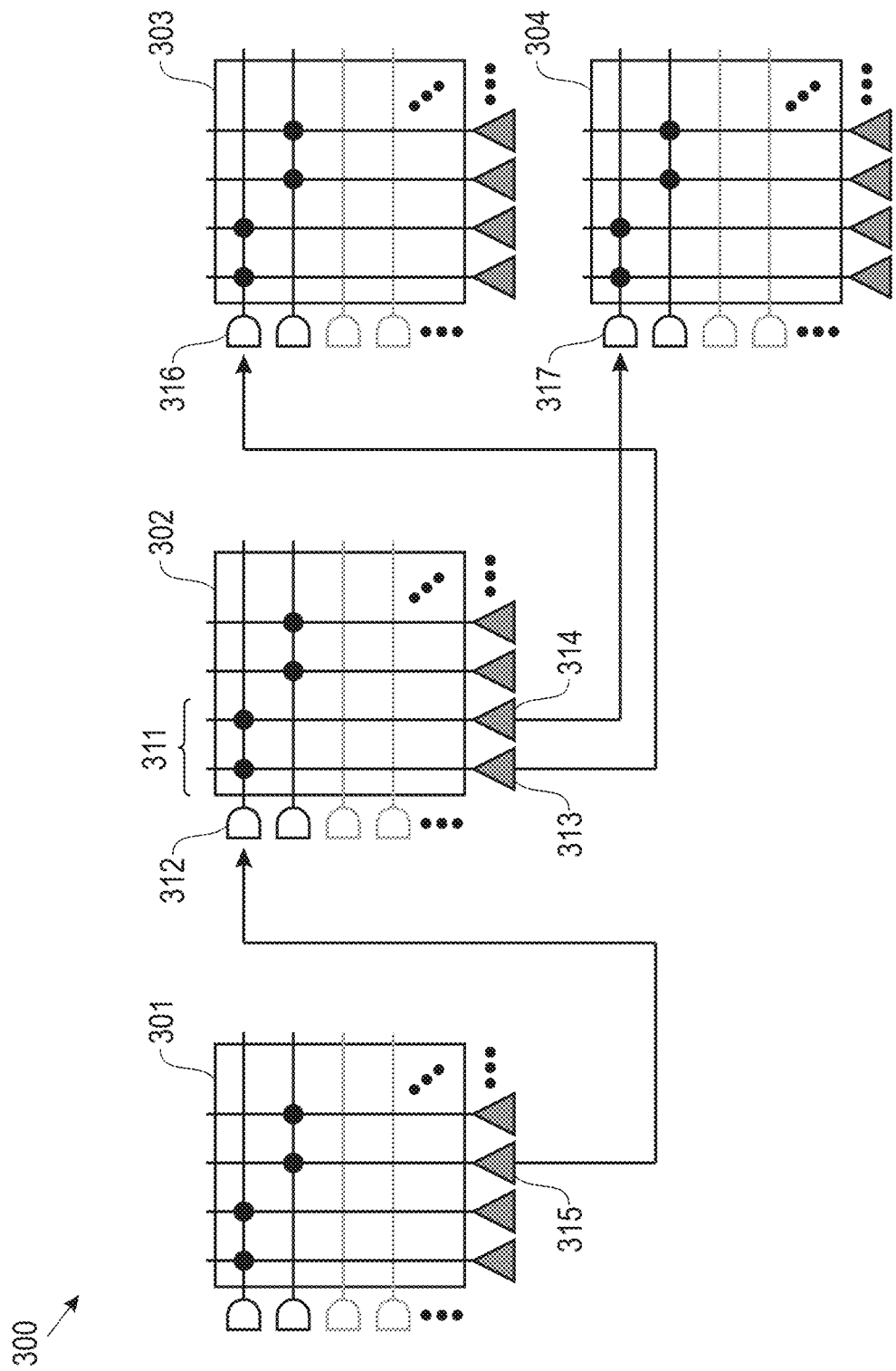
FIGS. 3A-B illustrate a network optimization according to embodiments of the present disclosure.
Figure 3B:
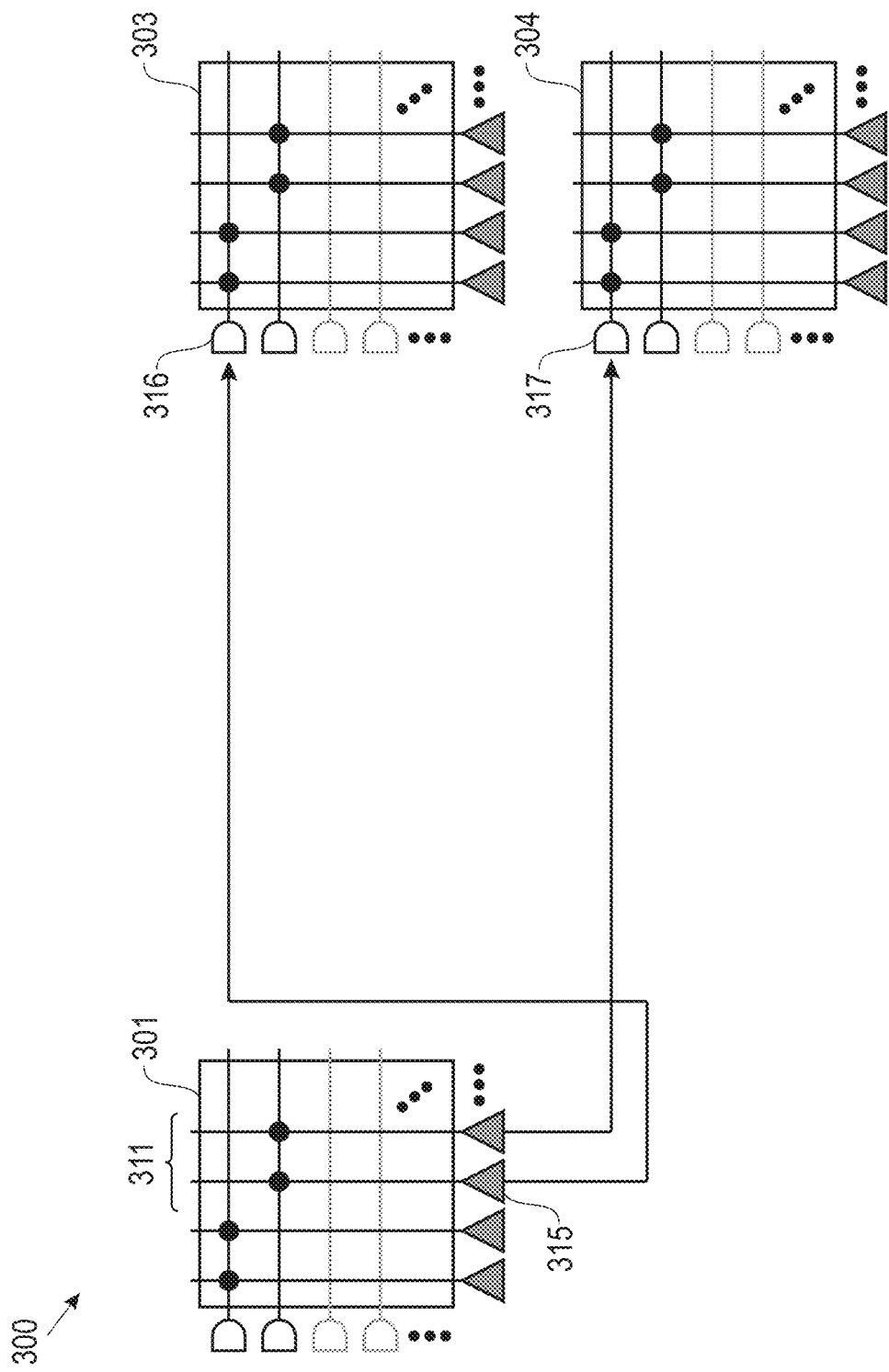

With reference now to FIG. 3, optimization of a network by moving splitters backward is illustrated. In FIG. 3A, exemplary network 300 includes cores 301 . . . 304. Core 302 includes splitter 311, having input axon 312 and output neurons 313 . . . 314. Input axon 312 is initially connected to neuron 315 of core 301. In FIG. 3B, according to this exemplary optimization, splitter 311 is moved into core 301, the core of its original source neuron 315. In this way, the total neuron count is reduced by one. The timing can be preserved by adding to the delay, except in cases where delay was maximized before the move.

According to an exemplary optimization method, an existing splitter (e.g., 311) is identified having one input (e.g., 312) and K outputs (e.g., 313 ... 314) on a core. The K corresponding destination axons (e.g., 316 ... 317) are identified on destination cores (e.g., 303 ... 304). Unused K−1 neurons are identified on the source core (e.g., 301) providing the source neuron (e.g., 315). The source neuron (e.g., 315) is duplicated K−1 times on the source core (e.g., 301), to create K identical neurons which will spike together. The synapses of the source neuron (e.g., 315) are replicated on the source core (e.g., 301) to all K−1 unused neurons, thus forming a replacement splitter. The source neuron is disconnected from the input to the original splitter and instead connected to the first destination axon (e.g., 316) of the splitter. For each of the remaining K−1 output neurons of the original splitter, the existing splitter neuron is disconnected and replaced with a connection from a new replicated neuron to the same destination.

In this manner, one neuron and one axon are saved. Timing can be preserved by adding to the delay, except in cases where delay was maximized before the move. Such a method may not be applicable where the source neuron is stochastic or has other properties which might prevent duplicating it.

Figure 4A:
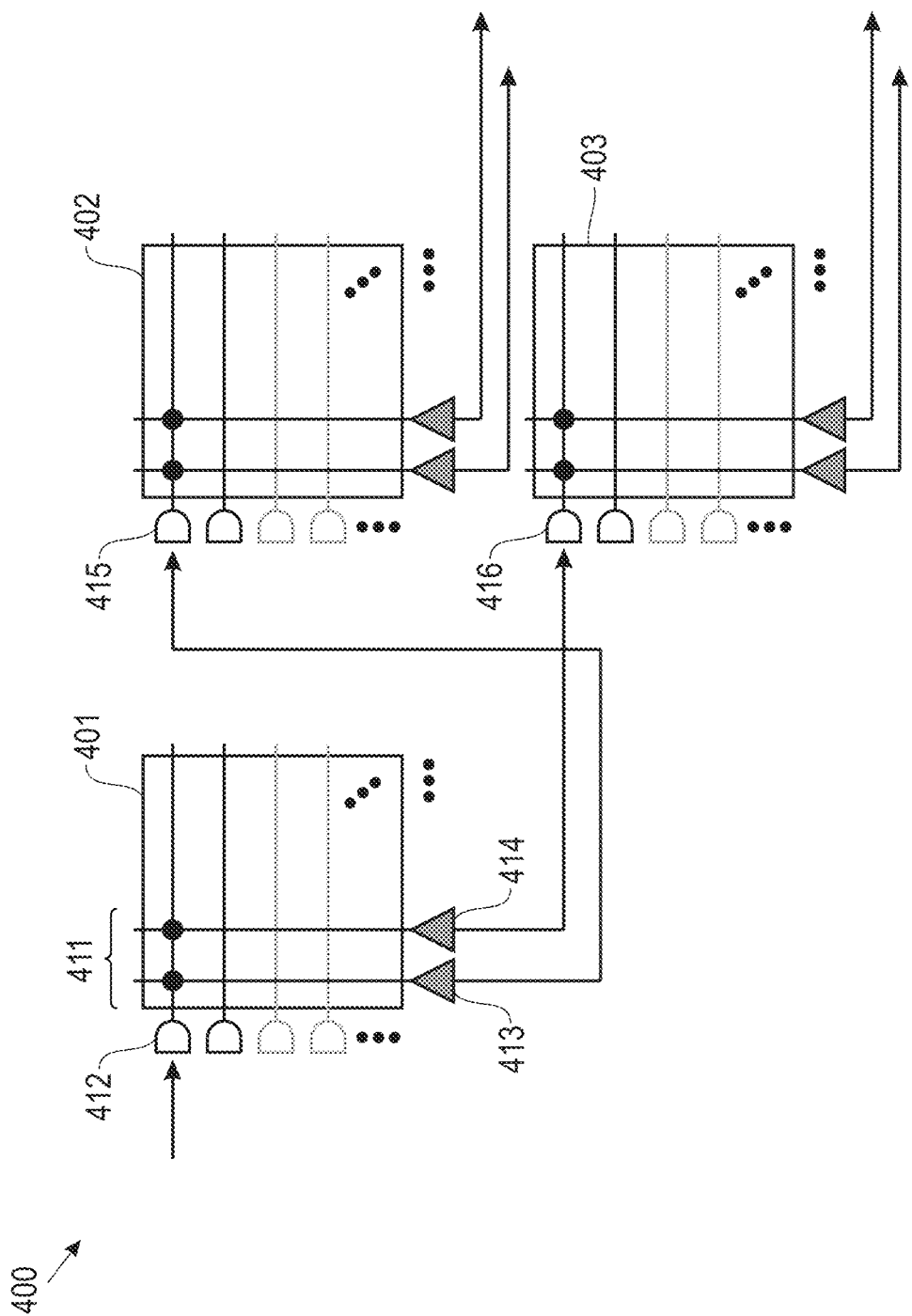
FIGS. 4A-B illustrate a network optimization according to embodiments of the present disclosure.
Figure 4B:
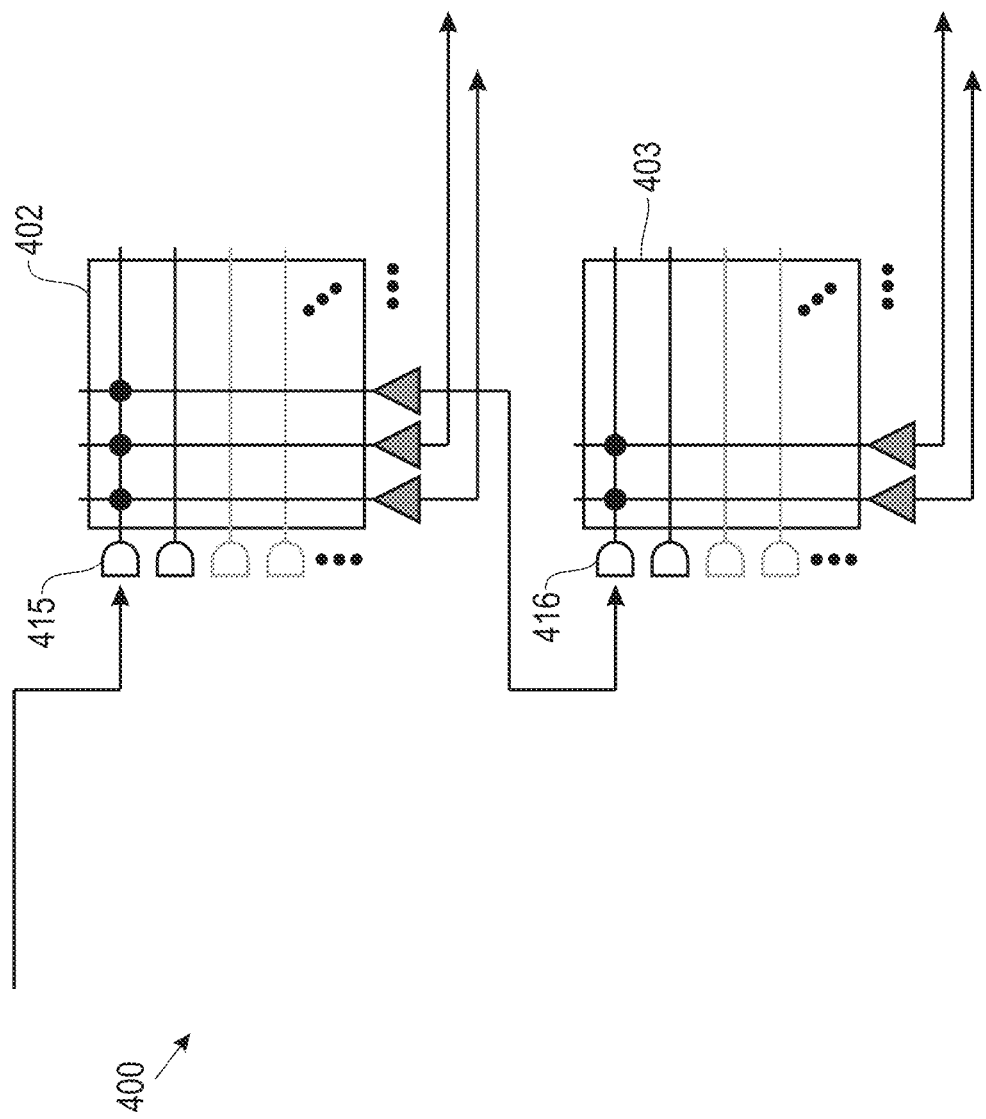

Referring now to FIG. 4, optimization of a network by moving splitters forward is illustrated. In FIG. 4A, exemplary network 400 includes cores 401 ... 403. Core 401 includes splitter 411, having input axon 412 and output neurons 413 ... 414. Output neurons 413 ... 414 are initially connected to axon 415 on core 402 and axon 416 on core 403. In FIG. 4B, according to this exemplary optimization, splitters 411 is moved forward into destination core 402. In this way, the total neuron count is reduced by one.

According to an exemplary optimization method, an existing splitter (e.g., 411) is identified having one input (e.g., 412) and K outputs (e.g., 413 ... 414). The up to K destination cores (e.g., 402 ... 403) are identified. Unused K−1 neurons on one of the destination cores (e.g., 402) are identified. This core will become the new splitter core. The input (e.g., at 412) is disconnected from the splitter (e.g., 411) and connected to the input axon on the new splitter core (e.g., 415 on core 402). Synapses on the new splitter core are connected between the input axon (e.g., 416) and the K−1 unused neurons. In some embodiment, these neurons are configured as splitters (synaptic weight=1, threshold=1, leak=0, reset mode=0). Each of the remaining K−1 output neurons of the original splitter, excluding the one which was connected to the input axon of the new splitter, are disconnected and replaced with a connection from a new neuron to the same destination.

In this manner, one neuron and one axon are saved. This optimization may affect timing. In particular, the receiving neurons on the new splitter core will now receive the spikes one tick earlier than before the change. Other cores will receive their spikes from the splitter as before.

Figure 5A:
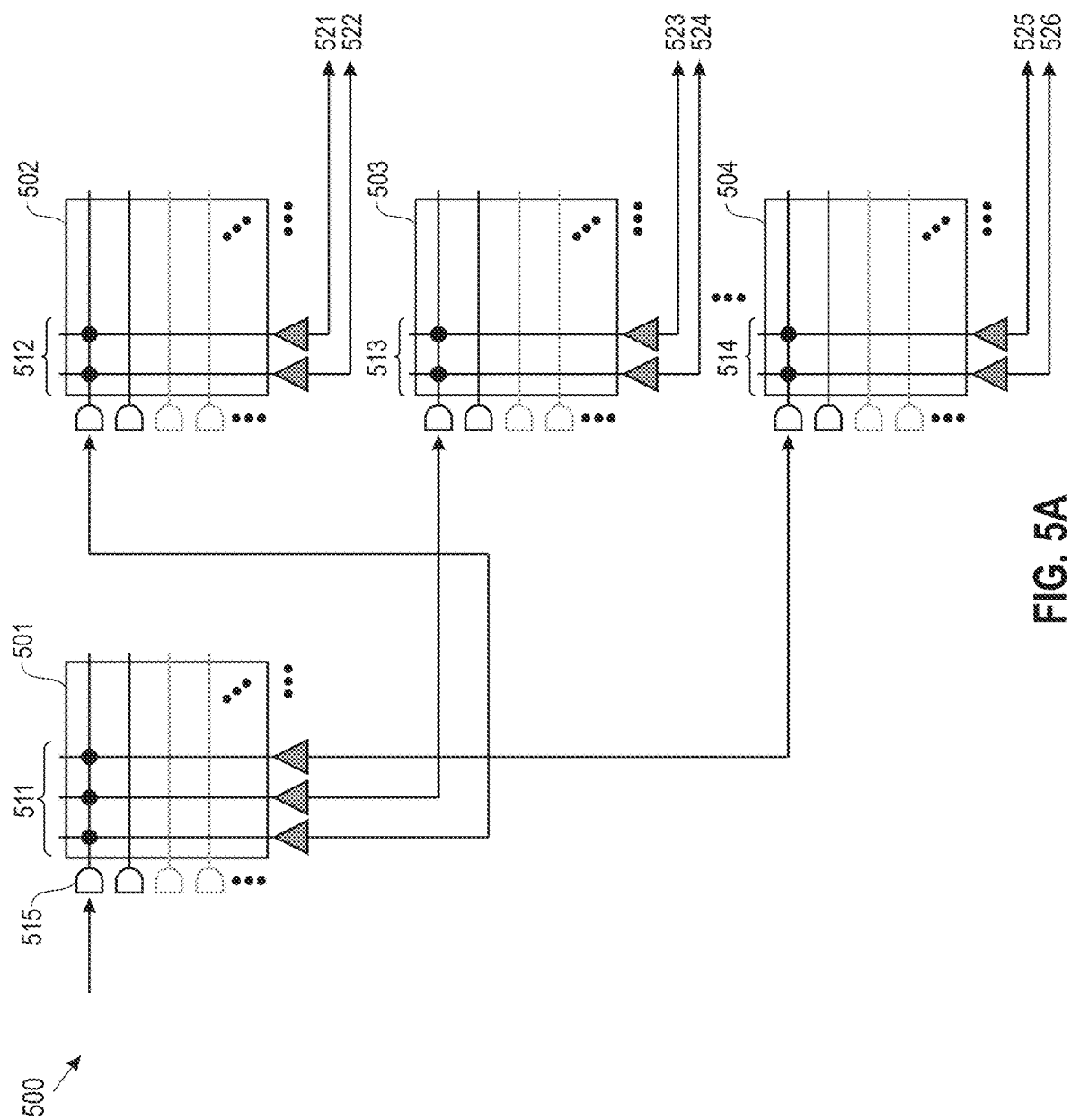
FIGS. 5A-B illustrate a network optimization according to embodiments of the present disclosure.
Figure 5B:
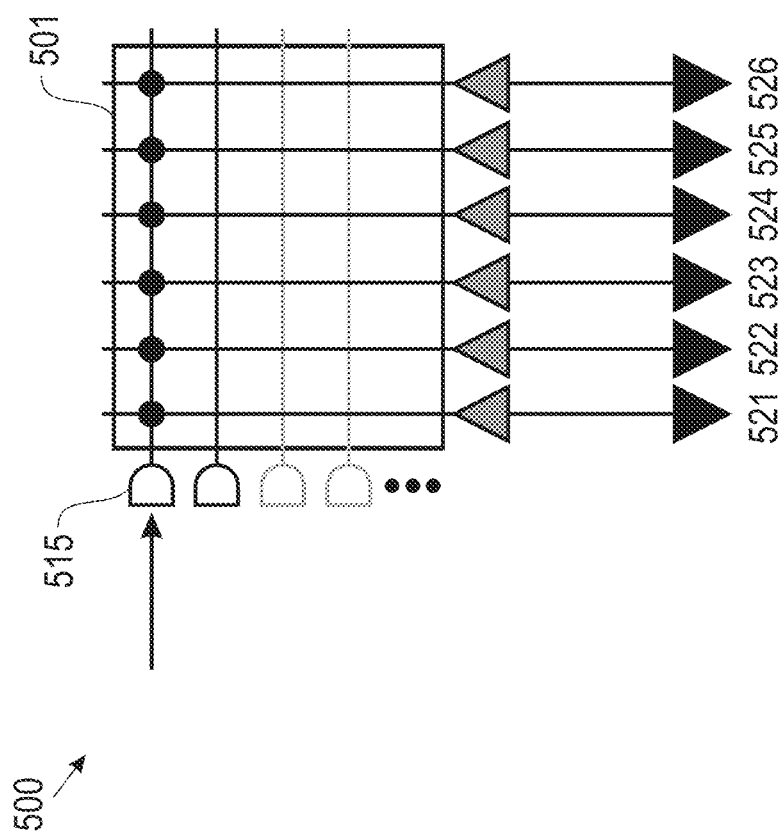

Referring now to FIG. 5, optimization of a network by flattening hierarchical splitter trees is illustrated. In FIG. 5A, exemplary network 500 includes cores 501 ... 504. Each core includes a splitter 511 ... 514. Splitters 512 ... 514 are connected to splitter 511 to form a tree or hierarchy. Outputs 521 ... 526 are generated by cores 502 ... 504. In FIG. 5B, this hierarchy is flattened to save neurons. In some embodiments, the original network latency is coded into the neuron delays.

According to an exemplary optimization method, an existing splitter (e.g., 511) with K outputs on a core is identified that is connected to at least one other secondary splitter (e.g., 512 ... 514). The secondary splitters (e.g., 512 ... 514) connected to it are identified. The total splits across these K splitters is given as $N=N_1+N_2 \ldots N_K$. Up to N−K unused neurons are identified on the existing splitter core (e.g., 511) are identified. Each secondary splitter (e.g., 512 ... 514) is disconnected from the primary splitter (e.g., 511). Previously unused neurons on the primary splitter are configured as splitters. In some embodiments, these neurons are configured with synaptic weight=1, threshold=1, leak=0, reset mode=0. Synaptic connections are added from the input axon (e.g., 515) of the primary splitter (e.g., 511) to these new neurons. The new outputs of the main splitter are connected to the destinations of the secondary splitter. Any cores that are no longer connected after this process are removed (e.g., 502 ... 504).

Referring now to FIG. 6, an exemplary delay neuron is illustrated. Core 601 includes input axon 611, which is connected to neuron 612. In some embodiments, delay neurons are removed from a network and replaced with spike delays. A delay neuron, such as neuron 612, is a neuron that is connected to only one axon, such as axon 611, which axon is only connected to that neuron, and which replicates the input spikes and outputs them after a fixed number of ticks. Such a neuron is similar to a splitter with just one output. It can sometimes be eliminated by adjusting spike delays on the source neuron from the previous layer.

According to an exemplary optimization method, an existing delay neuron is identified that has one input axon (e.g., 611) and one output neuron (e.g., 612) connected by a synapse. The source neuron on a source core is identified, the source neuron being connected to the input axon (e.g., 611) of the delay neuron. The source neuron is disconnected from the input axon (e.g., 611) and connected directly to the destination axon on the destination core, bypassing the delay neuron. The delay of the source neuron is adjusted to compensate for the loss of the intervening neurons. In some embodiments, where the intervening neurons have their own delays, the adjusted delay of the source neuron may be adjusted to a sum of the delays of the intervening neurons. In some embodiments, there is an upper limit to an individual neuron's delay parameter. In some embodiments, delay neurons may be eliminated only where the adjusted delay does not violate this upper limit. The above procedure may not be applicable in cases where the source and destination cores have different time scales.

In some embodiments, configuration parameters may be used to indicate which neuron timings should be preserved. For example, a configuration parameter may be provided in a splitter corelet indicating whether upon optimization timing should be preserved.

In some embodiments, multiple axons are collapsed through the use of combined synapses. In particular, two or more axons that have the same input coming from same splitter, the same axon type (hence same synaptic weights), and have mutually exclusive synapses (i.e., they never connect to the same neuron) then they can be collapsed to one axon with the combined (OR) synapses. For example, when multiple fractional corelets are placed on the same core, each may have a reset input axon. In such a case, all resets are coming from the same splitter, and so these reset axons can be merged into a single axon.

Figure 7C:
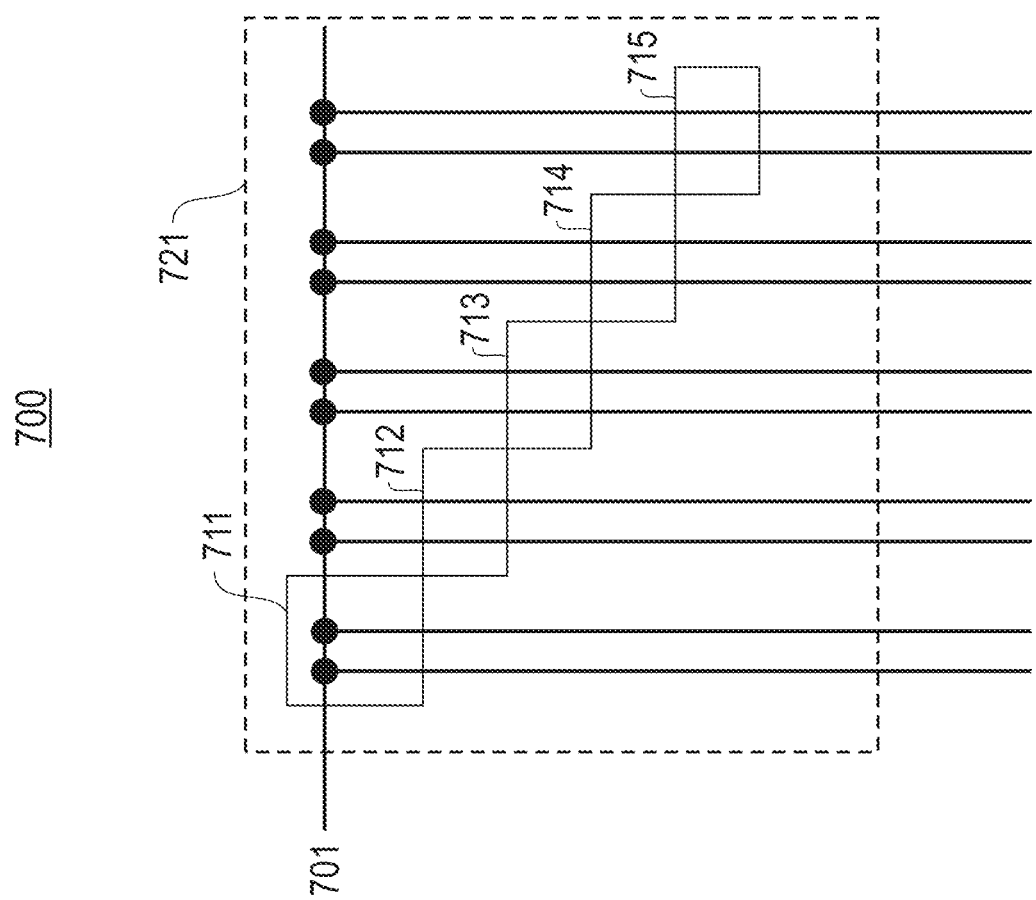

Referring now to FIG. 7, optimization of a network by collapsing reset axons is illustrated. In FIG. 7A, exemplary network 700 includes fractional corelets 711 . . . 714 laid out on core 721. Each fractional corelet 711 . . . 714 has a rest input 701 . . . 704. In FIG. 7B, the first reset input 701 is split and connected to corelets 712 . . . 714 in place of original reset inputs 702 . . . 704. In FIG. 7C, corelets 712 . . . 714 are laid out without original reset inputs 702 . . . 704, allowing the addition of corelet 715. If there are K such axons on a core, and they are collapsed to one axon, then K−1 axons are saved. Furthermore, similar fractional corelets residing on other cores can be moved to this core, using the neurons and axons which were freed and sharing the same reset input axon.

In general, when neurons and axons are saved on a core through any such optimization, those neurons and axons may be used to perform other part of the network computation. In particular, these neurons and axons may be used to implement a part of the network which was previously residing on another core. By moving parts of the network from some cores to other cores, some cores may be freed completely from performing any computation, and therefore be removed from the network, thereby reducing the total number of cores.

Figure 8:
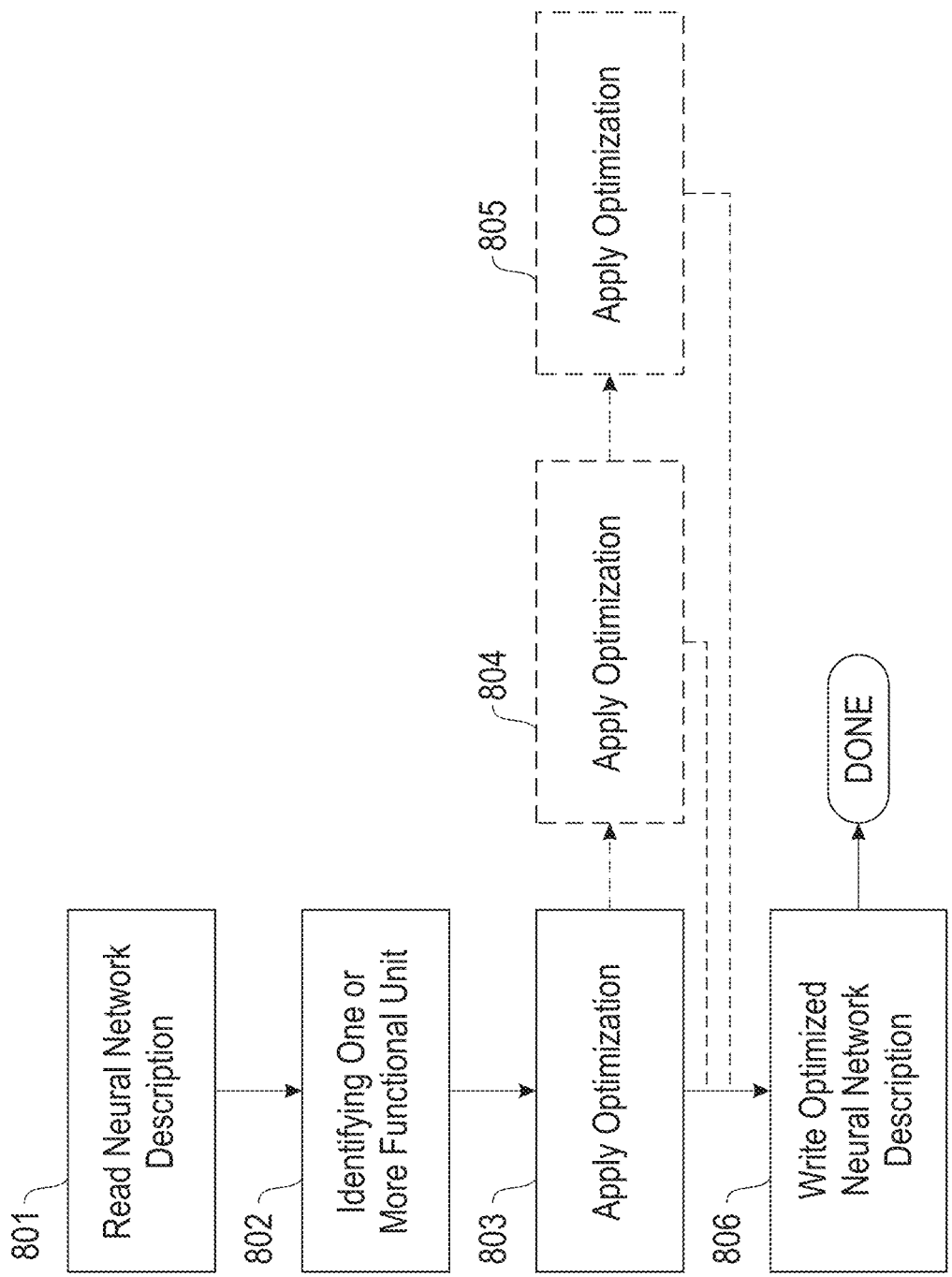
FIG. 8 illustrates an exemplary optimization process according to embodiments of the present disclosure.

Referring now to FIG. 8, an exemplary process for optimizing a neurosynaptic network is illustrated. A neural network description is read 801. In some embodiments, the neural network description comprises a model file describing a network and a placement file describing the relative placement of cores. For example, in a TrueNorth implementation, the model file may be an un-optimized model file describing a TrueNorth network and the placement file may define where each core from the model will be placed in the TrueNorth hardware. One or more function unit is identified. As noted above, a functional unit is may be a splitter, a delay neuron, or another discrete functionality comprising one or more neuron and axon connected by one or more synapse. In some embodiments, a functional unit may be defined by a corelet. One or more optimizations 803 . . . 805 such as those described above may be applied to the network. After optimization, an optimized description of the network is written 806. In some embodiments, the optimized description is written to an optimized model file. In some embodiments, the optimized model file is then used to perform layout of neurons in one or more physical core.

Figure 9:
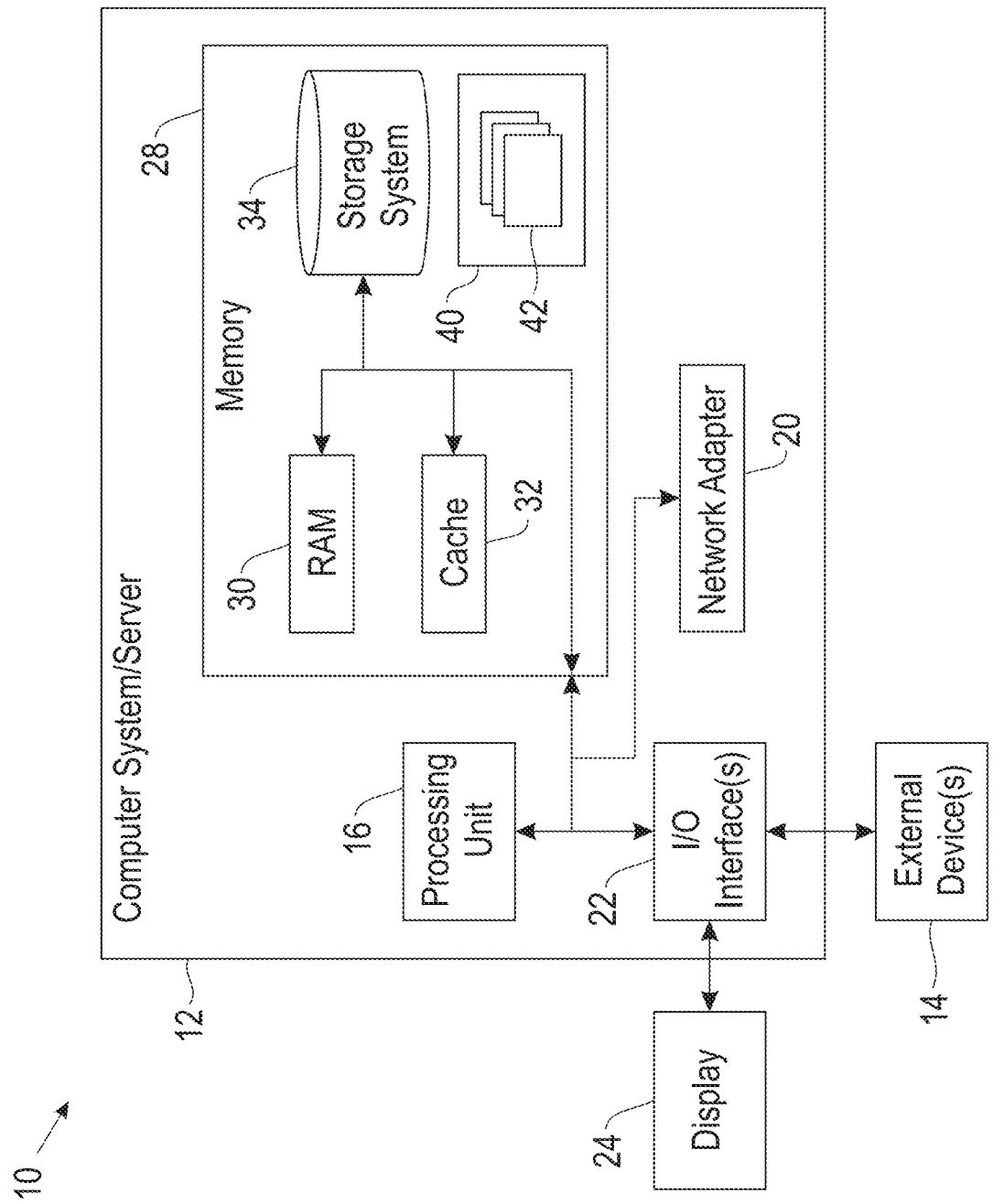
FIG. 9 depicts a computing node according to an embodiment of the present invention.

Referring now to FIG. 9, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   reading a neural network description describing a neural network;
   identifying one or more functional unit of the neural network, wherein the one or more functional unit comprises a first splitter on a first core operably connected to a second splitter on a second core;
   optimizing the one or more functional unit of the neural network, wherein optimizing the one or more functional unit comprises merging the first splitter and the second splitter on a single core;
   writing an optimized neural network description based on the optimized functional unit.

2. The method of claim 1, wherein the one or more functional unit comprises a delay neuron.

3. The method of claim 1, wherein optimizing the one or more functional unit comprises removing at least one neuron, axon, or core while maintaining the function of the one or more functional unit.

4. The method of claim 1, wherein the one or more functional unit comprises a delay neuron operably connected to a source neuron and wherein optimizing the one or more functional unit comprises removing the delay neuron and increasing a delay associated with the source neuron.

5. The method of claim 1, wherein the neural network comprises at least one neuron and the neural network description comprises a parameter indicating whether a timing of the at least one neuron should be preserved during optimization.

6. The method of claim 1, wherein the one or more functional unit comprises a first functional unit on the first core, a second function unit on the second core, and a splitter operably connected to the first and second functional unit and wherein optimizing the one or more functional unit comprises merging the first and second functional unit on a single core.

7. The method of claim 1, wherein the neural network description describes a plurality of cores in a neuromorphic system.

8. The method of claim 1, wherein each of the one or more functional unit comprises a reset axon and wherein optimizing the one or more functional unit comprises splitting one of the reset axons and removing each other reset axon.

9. A computer program product for optimizing a neurosynaptic network, the computer program product comprising a non-transitory computer readable storage medium having program instructions embodied therewith, the program instructions executable by a processor to cause the processor to perform a method comprising:
   reading a neural network description describing a neural network;
   identifying one or more functional unit of the neural network, wherein the one or more functional unit comprises a first splitter on a first core operably connected to a second splitter on a second core;
   optimizing the one or more functional unit of the neural network, wherein optimizing the one or more functional unit comprises merging the first splitter and the second splitter on a single core;
   writing an optimized neural network description based on the optimized functional unit.

10. The computer program product of claim 9, wherein the one or more functional unit comprises a delay neuron.

11. The computer program product of claim 9, wherein optimizing the one or more functional unit comprises removing at least one neuron, axon, or core while maintaining the function of the one or more functional unit.

12. The computer program product of claim 9, wherein the one or more functional unit comprises a delay neuron operably connected to a source neuron and wherein optimizing the one or more functional unit comprises removing the delay neuron and increasing a delay associated with the source neuron.

13. The computer program product of claim 9, wherein the neural network comprises at least one neuron and the neural network description comprises a parameter indicating whether a timing of the at least one neuron should be preserved during optimization.

14. The computer program product of claim 9, wherein the one or more functional unit comprises a first functional unit on the first core, a second function unit on the second core, and a splitter operably connected to the first and second functional unit and wherein optimizing the one or more functional unit comprises merging the first and second functional unit on a single core.

15. The computer program product of claim 9, wherein the neural network description describes a plurality of cores in a neuromorphic system.

16. The computer program product of claim 9, wherein each of the one or more functional unit comprises a reset axon and wherein optimizing the one or more functional unit comprises splitting one of the reset axons and removing each other reset axon.

* * * * *